Patented Apr. 27, 1948

2,440,489

UNITED STATES PATENT OFFICE 2,440,489

PROCESS FOR DEHYDRATING AQUEOUS MIXTURES

Raphael Rosen, Elizabeth, and John C. Zimmer, Union, N. J., assignors to Standard Oil Development Company, a corporation of Delaware No Drawing. Application November 3, 1945, Serial No. 626,580

9 Claims. (Cl. 252—321)

The present invention relates to a process for dehydrating various compositions which are of a type which give rise to large volumes of foam on ebullition, or which tend to bump and spatter so as to make heating during use or processing difficult, and the application more particularly relates to the dehydrating of such compositions in the presence of improved foam suppressors.

In many cases it is desirable to dehydrate or partially dehydrate compositions containing water by vaporization thereof, but these operations are often difficult where the composition has a tendency to produce large volumes of foam or to spatter and bump on boiling. Such materials may be various aqueous solutions, organic or inorganic salts, and the compounds, colloidal materials and other materials of an organic nature containing water also foam heavily on boiling, for example, this is apt to occur during the process of grease making where fatty oils are saponified and the water produced must be largely evaporated, in various methods of processing fatty oils and similar products. Such difficulties are often so great as to induce the manufacturer to adopt less direct methods, but where the dehydration cannot be avoided, one expedient is to employ a vessel with excessively large head room, which is expensive and wasteful.

It has been found that certain halogenated olefin polymers are quite effective in suppressing foaming, spattering or bumping during ebullition, when such materials are added, even in very small amounts, to the material to be dehydrated or processed. The materials referred to above as foam suppressing substances are in the main polymer derivatives of chloro-fluorinated olefins, particularly those olefins in which most of the hydrogen has been replaced by chlorine and fluorine. The polymers contemplated herein are chiefly those produced from olefins of 2 to 10 carbon atoms, and the polymers themselves are thick, viscous liquids or solids of low volatility and of the range of 10 to 50 carbon atoms to the molecule.

One of the best of these polymers is obtained by polymerizing trichloro-tri-fluoro-propene, but other materials of the general class described are good, such as polymers of chloro-fluoro-ethylene, butene, hexene, and the like. Another particularly good material is the polymer of trifluoro-monochlorethylene. The polymers may be made by preparing chloro-fluoro monomers and effecting the polymerization by any well known means, such as heating or catalytic action, for example, the action of peroxides and the like, but it is not necessary to start with olefins themselves, since saturated chloro-fluoro hydrocarbons, which still contain hydrogen, have been found to generate the olefin during polymerization by the splitting off of HCl or HF, as the case may be, and polymerization follows so that, in effect, the saturated materials containing hydrogen are the equivalents of the monomeric olefins. Thus, for example, 50 grams of trichloro-trifluoro propane may be heated with 15 grams of potassium hydroxide and 200 grams of isopropanol for 4 hours in a reflux condenser. Under the action of the hot alkali solution, the trichloro-trifluoro propane splits off HCl and gives trifluoro-dichloro propene which then polymerizes. At the end of the 4 hour polymerization period, the alcohol and unsaturated material are distilled off, leaving a polymer which is then dissolved in benzol, filtered, and the solvent distilled. The final polymer amounted to a 15% yield.

Fluorination may be accomplished by treating the partly chlorinated olefin with elementary fluorine or with antimony fluoride according to the method described by Bockemueller, (Ann. 506, 20; 1933. Augewandte Chemie, 53, 419; 1943) and by Simons, (Simons, Bond, McArthur, J. A. C. S., 62, 3477). Another method is to halogenate to a high degree with a cheaper halogen, such as chlorine, for example, and then to replace so much as is desired with fluorine by means of antimony fluoride.

The chloro-fluoro polymers referred to above have been found to be extremely good, but, if desired, part of the chlorine or fluorine may be substituted or replaced by other negative groups, for example, —OR, —COOR, —NH$_2$, —CN, —NO$_2$ or —SH. These may be introduced into the polymer by a treatment with alkali or alkaline earth salts of organic acids to form esters; with alcoholates to form ethers; with mercaptides to form sulfides or hydrosulfides; with ammonia to give amines and with other known agents for introducing cyanide and nitro-groups. In some instances these materials may prove to be somewhat better than the simple chloro-fluoro olefins, but in most cases they are not better than the simple polymers.

In carrying out the present invention a small quantity of the particular polymer is added to the material to be dehydrated at any prior stage of manufacture or utilization, so that it will be present when dehydration occurs. The amount used is generally in the range of 1 to 50 grams per thousand square inches of evaporating surface. In some cases this is not a convenient measure and it may be more desirable to employ materials on the basis of weight per cent. On this basis the quantity required runs from .001% to at most about 10% of the material being dehydrated. To further illustrate the use of the present invention, the following examples may be considered:

Example 1

A hydrocarbon or lubricating oil solution of a calcium petroleum sulfonate of a lubricating oil fraction, i. e., the sulfonate having been obtained by the treatment of a petroleum fraction with concentrated sulfuric acid, contained 12% of water and was to be dehydrated.

A sample of 250 cc. of the above solution was heated in an open vessel to about 212° F., whereupon the liquid mixture began to foam, spatter and bump violently, so that the operation was extremely difficult and the dehydration unsuccessful.

To a similar sample was added one drop of polymerized trichloro-trifluoro-propene, which was a thick, viscous oily material. On heating this mixture to 212° F. there was a gradual release of steam but little or no bumping, spattering or foaming. Dehydration was easily accomplished and to insure completeness, the temperature was raised to 280° F. without difficulty.

Example 2

An oily mixture containing 65% degras and 35% water was to be dehydrated. Just as in Example 1, a sample of 250 cc. was heated in an open vessel with the same result, namely that dehydration was difficult because of excessive foaming, bumping and spattering.

To a similar sample one drop, which amounted to less than .10% of the sample, of a polymer of trichloro-trifluoro-propene was added, and the dehydration was easily effected without excessive foaming, spattering or bumping. To insure complete dehydration the temperature was raised to 280° F.

We claim:

1. An improved process for dehydrating water-containing liquids which normally foam excessively on ebullition, which comprises evaporating water from the liquid by heat in the presence of a small quantity, sufficient to substantially prevent foaming, of a liquid, low-volatility polymer of a chloro-fluoro olefin monomer said polymer having 10 to 50 carbon atoms per molecule.

2. Process according to claim 1, in which the polymer is produced from a chloro-fluoro olefin monomer of 2 to 10 carbon atoms.

3. Process according to claim 1, in which the liquid to be dehydrated is an oleaginous liquid.

4. Process according to claim 1, in which the liquid is an aqueous solution of a metal salt.

5. Process according to claim 1, in which the liquid is an aqueous colloidal solution.

6. An improved process for dehydrating water-containing liquids which normally foam excessively during ebullition, which comprises adding to the liquid a thick, viscous, oily polymer of a chloro-fluoro olefin monomer of 2 to 10 carbon atoms in an amount ranging between 0.001% and 10% by weight of the material being dehydrated, and heating the mixture to evaporate the water therefrom.

7. Process according to claim 6, in which the polymer is a polymer of trichloro-trifluoro propene.

8. Process according to claim 6, in which the polymer is a polymer of trifluoromonochlorethylene.

9. An improved process for dehydrating water-containing oleaginous liquids which normally foam excessively during ebullition, comprising adding to the liquid a viscous, oily polymer of trichloro-trifluoro propene in amounts ranging between 0.001 and 10% by weight of the liquid being dehydrated, and heating the liquid to evaporate the water therefrom.

RAPHAEL ROSEN.
JOHN C. ZIMMER.

REFERENCES CITED

The following references are of record in the file of this patent:

UNITED STATES PATENTS

| Number | Name | Date |
| --- | --- | --- |
| 2,186,916 | Wiezevich | Jan. 9, 1940 |
| 2,362,094 | Renoll | Nov. 7, 1944 |
| 2,375,007 | Larsen | May 1, 1945 |
| 2,377,297 | Lamb et al. | May 29, 1945 |
| 2,394,596 | Davis et al. | Feb. 12, 1946 |
| 2,396,713 | Martin | Mar. 19, 1946 |
| 2,411,159 | Hanford | Nov. 19, 1946 |

FOREIGN PATENTS

| Number | Country | Date |
| --- | --- | --- |
| 796,026 | France | Jan. 17, 1936 |